US012740914B1

(12) United States Patent
Shao

(10) Patent No.: US 12,740,914 B1
(45) Date of Patent: Sep. 22, 2026

(54) DRIVING MECHANISM WITH COMPOUND MASSAGE ACTIONS

(71) Applicant: Shenzhen Hijoy Technology Co., Ltd., Shenzhen (CN)

(72) Inventor: Zhubiao Shao, Shenzhen (CN)

(73) Assignee: Shenzhen Hijoy Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/401,257

(22) Filed: Nov. 25, 2025

(30) Foreign Application Priority Data

Nov. 5, 2025 (CN) ........................ 202522361077.8

(51) Int. Cl.
*A61H 7/00* (2006.01)

(52) U.S. Cl.
CPC ..... *A61H 7/004* (2013.01); *A61H 2201/1215* (2013.01); *A61H 2201/149* (2013.01); *A61H 2201/1669* (2013.01)

(58) Field of Classification Search
CPC ........ A61H 19/00; A61H 19/30; A61H 19/32; A61H 7/00; A61H 7/004; A61H 7/005; A61H 23/00; A61H 23/0254; A61H 2201/149; A61H 2201/1664; A61H 2201/1666; A61H 2201/1669
See application file for complete search history.

(56) References Cited

U.S. PATENT DOCUMENTS

| | | | | |
|---|---|---|---|---|
| 11,737,949 B1 * | 8/2023 | Huang | A61H 19/32 600/38 |
| 2005/0215927 A1 * | 9/2005 | Chang | A61H 7/001 601/93 |
| 2025/0161148 A1 * | 5/2025 | Wang | A61H 23/0254 |

FOREIGN PATENT DOCUMENTS

CN 115177506 A * 10/2022 ............... A61G 7/00

OTHER PUBLICATIONS

CN 115177506 A machine translation accessed Jan. 23, 2026 (Year: 2026).*

* cited by examiner

*Primary Examiner* — Brandy S Lee
*Assistant Examiner* — Kelsey Rhee

(57) ABSTRACT

The present application discloses a driving mechanism with compound massage actions, including a bracket, on which a first, second, and third massage portions are slidably mounted. The bracket has a power mechanism inside, to which the first massage portion is eccentrically and rotatably connected. The power mechanism includes a connecting rod, which connects to a first connecting rod assembly at one end and a second connecting rod assembly at the other end. The first and second connecting rod assemblies are rotatably connected to the second and third massage portions, respectively. A matching angle adjustment structure is provided at the connection between the connecting rod and the second connecting rod assembly. The second and third massage portions reciprocate synchronously/asynchronously when the connecting rod rotates counterclockwise/clockwise. The driving mechanism performs different compound massage actions on a body part in the first and second massage chambers to improve massage comfort and effect.

14 Claims, 9 Drawing Sheets

DRIVING MECHANISM WITH COMPOUND MASSAGE ACTIONS

RELATED APPLICATIONS

The present application claims the benefit of priority of Chinese Patent Application No. 2025223610778, filed Nov. 5, 2025, and entitled "DRIVING MECHANISM WITH COMPOUND MASSAGE ACTIONS" the entire content of which is incorporated herein by reference.

TECHNICAL FIELD

The present application relates to the technical field of massagers, and in particular to a driving mechanism with compound massage actions.

BACKGROUND

Massagers are mainly used to massage local parts of a human body to relieve physical fatigue for physical and mental relaxation. Existing massagers are usually designed with motors and transmission mechanisms to realize rotation, extension, and retraction of the massage portion, thereby massaging a certain part of a human body. However, during actual massage, it may be impossible for some parts of the human body to be further inserted into the massager due to their relative positions, and simple rotating or retracting massage is mainly used for the inserted part. For existing massagers, when the above functions are integrated, the single motor can realize only one of the above functions, resulting in low massage comfort of the human body during actual massage.

SUMMARY

(I) Technical Issues

The purpose of the present application is to provide a driving mechanism with compound massage actions, which solves the problem that in the prior art, only a single power mechanism is configured to realize a single massage action, instead of compound actions, resulting in poor massage comfort.

(II) Technical Solution

In order to achieve the above purpose, the present application provides the following technical solution:

A driving mechanism with compound massage actions includes a bracket; a first massage portion, a second massage portion, and a third massage portion are slidably mounted on the bracket; the first massage portion is provided with a first massage chamber, the second massage portion and the third massage portion enclose to form a second massage chamber, and the first massage chamber and the second massage chamber are coaxially arranged; and the bracket is provided with a power mechanism inside. The first massage portion is eccentrically and rotatably connected to the power mechanism, and the power mechanism includes a connecting rod, one end of which is connected to a first connecting rod assembly, and the other end of which is connected to a second connecting rod assembly. The first connecting rod assembly is rotatably connected to the second massage portion, and the second connecting rod assembly is rotatably connected to the third massage portion. The connection between the connecting rod and the second connecting rod assembly is provided with a matching angle adjustment structure. When the connecting rod rotates counterclockwise, the second massage portion and the third massage portion slide back and forth synchronously. When the connecting rod rotates clockwise, the second massage portion and the third massage portion slide back and forth asynchronously.

Preferably, the matching angle adjustment structure includes a first limiting portion provided at the end portion of the connecting rod and a first matching piece provided on the second connecting rod assembly. The first limiting portion has a first positioning surface and a second positioning surface arranged at a 90-degree angle to each other. The first matching piece has a first matching surface and a second matching surface arranged at a 270-degree angle to each other. When the connecting rod rotates counterclockwise, the first positioning surface fits the first matching surface. When the connecting rod rotates clockwise, the second positioning surface fits the second matching surface.

Preferably, the first connecting rod assembly includes a first pull rod rotatably connected to the second massage portion and a first rotating block rotatably connected to the end portion of the first pull rod. The first rotating block is fixedly connected to the connecting rod.

Preferably, the second connecting rod assembly includes a second pull rod rotatably connected to the third massage portion and a second rotating block rotatably connected to the end portion of the second pull rod. The first matching piece is provided on the second rotating block.

Preferably, the power mechanism includes a drive motor installed in the bracket. An eccentric wheel is installed at one end of the output shaft of the drive motor, and a connecting column connected to the first massage portion is provided on the eccentric wheel. A first bevel gear is installed at the other end of the output shaft of the drive motor, and a second bevel gear meshing with the first bevel gear is installed on the connecting rod.

Preferably, the first massage portion includes a front bracket seat slidably mounted on the bracket, the front bracket seat is provided with an inner ring layer and an outer ring layer coaxially arranged, and a connecting portion evenly distributed along a circumferential direction is provided between the inner ring layer and the outer ring layer. The front bracket seat is provided with a sliding slot that slidably fits with the connecting column.

Preferably, the second massage portion includes a first slider slidably mounted on the bracket and a first rubbing bracket mounted on the first slider. The second massage portion further includes a second slider slidably mounted on the bracket and a second rubbing bracket mounted on the second slider.

Preferably, two upper guide rods are installed on the bracket at a distance from each other, and the front bracket seat is slidably installed on the two upper guide rods; and two lower guide rods are installed on the bracket at a distance from each other, the first slider is installed on the upper guide rod and the lower guide rod located on one side of the bracket, and the second slider is installed on the upper guide rod and the lower guide rod located on the other side of the bracket.

Preferably, the inner ring layer and the outer ring layer are configured to embed a flexible massage ring.

Preferably, both the first rubbing bracket and the second rubbing bracket are provided with a flexible massage portion of a semi-ring structure, and two flexible massage portions enclose to form a second massage chamber.

Preferably, the bracket is provided with a first mounting cavity for installing the drive motor, and the bracket is further provided with a cover body for closing the first mounting cavity.

Preferably, the cover body is provided with a rotating half-groove for installing the connecting rod, and a limit cover is installed on the rotating half-groove for limiting the connecting rod.

Preferably, the bracket is provided with a second mounting cavity for mounting a battery, and the bracket is further provided with a sealing cover for sealing the second mounting cavity.

Preferably, the bracket is provided with a space for mounting an integrated circuit board.

Preferably, the drive motor is a brushed motor or a brushless motor.

Preferably, the bracket is provided with a weight-reducing cavity, and ribs and mounting columns are provided in the weight-reducing cavity.

(III) Beneficial Effects

A matching angle adjustment structure is provided at the connection between the connecting rod and the second connecting rod assembly. When the connecting rod rotates clockwise or counterclockwise, the second connecting rod assembly can be adjusted to act synchronously or asynchronously relative to the first connecting rod assembly. As a result, the entire mechanism can realize two compound actions. One is when the first massage portion performs reciprocating massage, the second and third massage portions perform reciprocating massage synchronously. The other is when the first massage portion performs reciprocating massage, the second and third massage portions perform reciprocating massage asynchronously (rubbing massage), making the massage actions of the driving mechanism more compound. Upon insertion of a body part into the first massage chamber and the second massage chamber, the driving mechanism performs different compound massage actions to improve the massage comfort on the human body and enhance the massage effect.

BRIEF DESCRIPTION OF THE DRAWINGS

In FIGS. 1 to 9, the relationship between the component names or lines and reference numerals is as follows:

Figure 1:
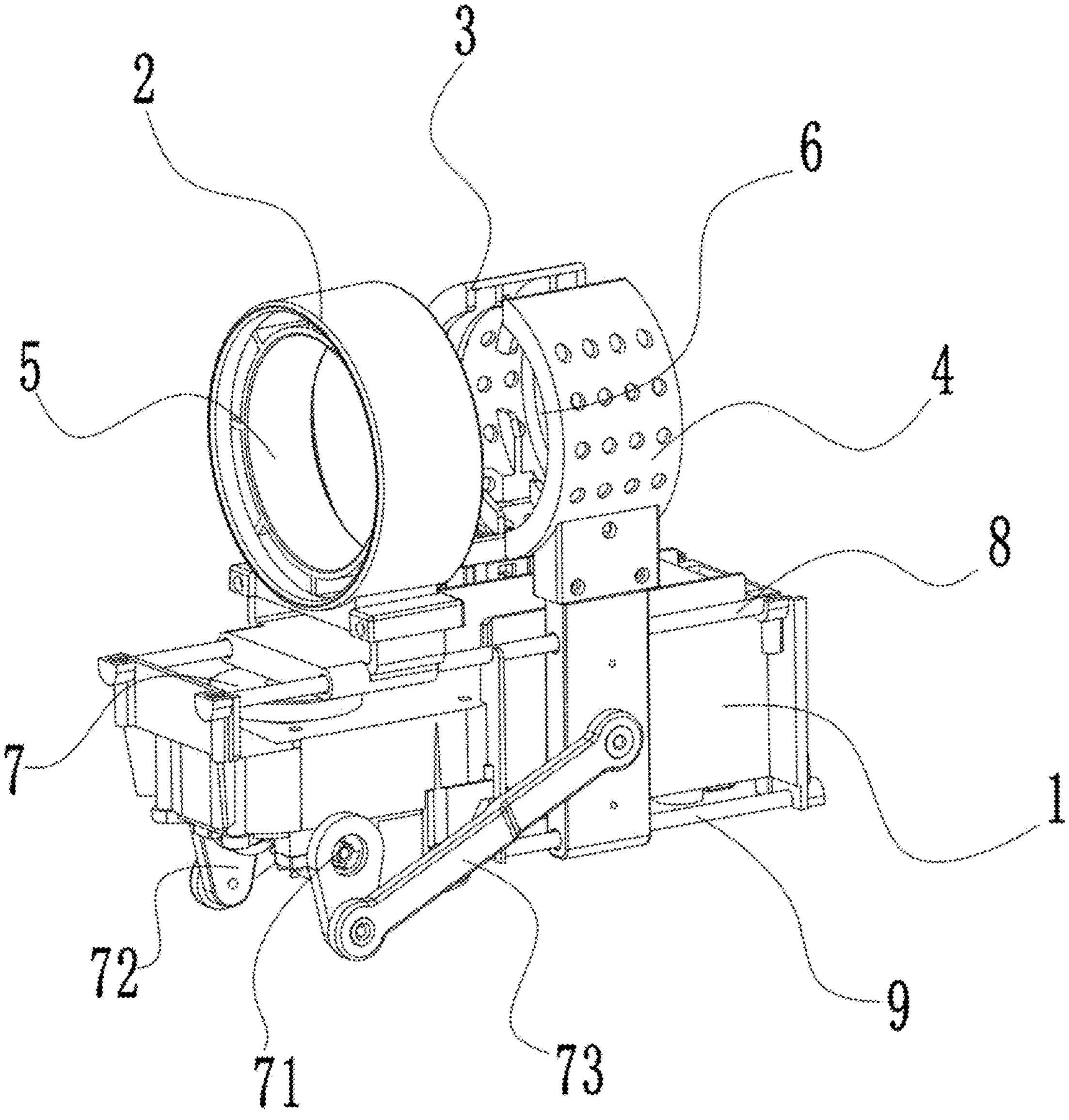
FIG. 1 is a schematic diagram of a first-view three-dimensional structure according to an embodiment of the present application.
Figure 2:
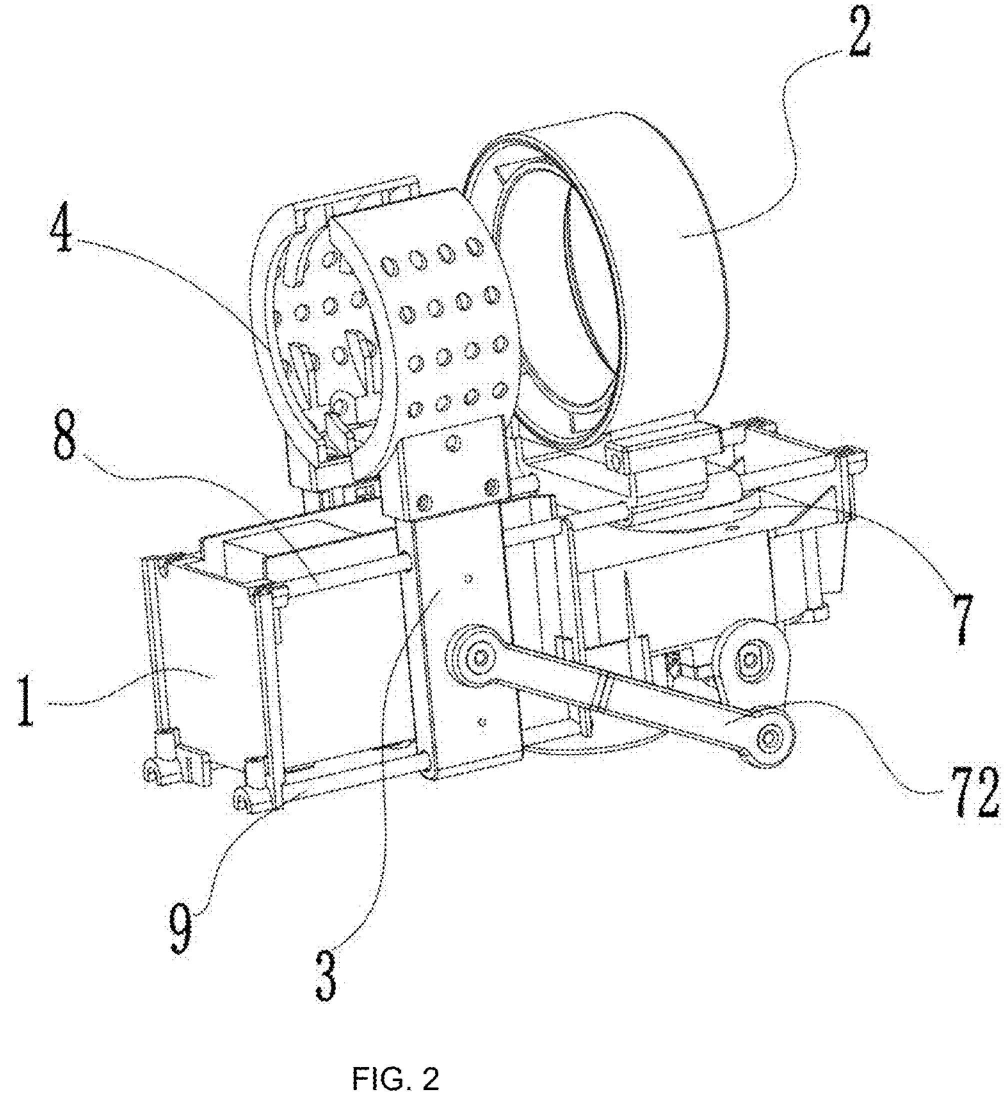
FIG. 2 is a schematic diagram of a second-view three-dimensional structure according to an embodiment of the present application.

Bracket: 1; first massage portion: 2; front bracket seat: 21; inner ring layer: 22; outer ring layer: 23; sliding slot: 24; second massage portion: 3; first slider: 31; first rubbing bracket: 32; third massage portion: 4; second slider: 41; second rubbing bracket: 42; first massage chamber: 5; second massage chamber: 6; power mechanism: 7; connecting rod: 71; first connecting rod assembly: 72; first pull rod: 721; first rotating block: 722; second connecting rod assembly: 73; second pull rod: 731; second rotating block: 732; first limiting portion: 74; first positioning surface: 741; second positioning surface: 742; first matching piece: 75; first matching surface: 751; second matching surface: 752; drive motor: 76; eccentric wheel: 77; connecting column: 771; first bevel gear: 78; second bevel gear: 79; upper guide rod: 8; lower guide rod: 9; first mounting cavity: 10; lid: 11; rotating half-groove: 12; limit cover: 13; second mounting cavity: 14; sealing cover: 15.

DETAILED DESCRIPTION

The technical solutions in the embodiments of the present application will be clearly and completely described below with reference to the drawings in the embodiments of the present application. Obviously, the embodiments described are only a part of, not all, the embodiments of the present application.

As shown in FIGS. 1 to 4, a driving mechanism with compound massage actions is provided in an embodiment of the present application, which is configured to be equipped in a massager and perform compound massage on human body parts to improve the massage effect. Specifically, the driving mechanism with the compound massage actions includes a bracket 1; a first massage portion 2, a second massage portion 3, and a third massage portion 4 are slidably mounted on the bracket 1; the first massage portion 2 is provided with a first massage chamber 5, the second massage portion 3 and the third massage portion 4 enclose to form a second massage chamber 6, and the first massage chamber 5 and the second massage chamber 6 are coaxially arranged. Arranging the first massage chamber 5 and the second massage chamber 6 allows the provision of at least two massage effects after a human body part is inserted. Furthermore, coaxiality is ensured to avoid injury or discomfort to the human body during massage, thereby guaranteeing safety throughout the massage process. Specifically, during the massage process, the first massage portion 2, the second massage portion 3, and the third massage portion 4 are driven to slide back and forth relative to the bracket 1, forming effective massage actions.

Figure 5:
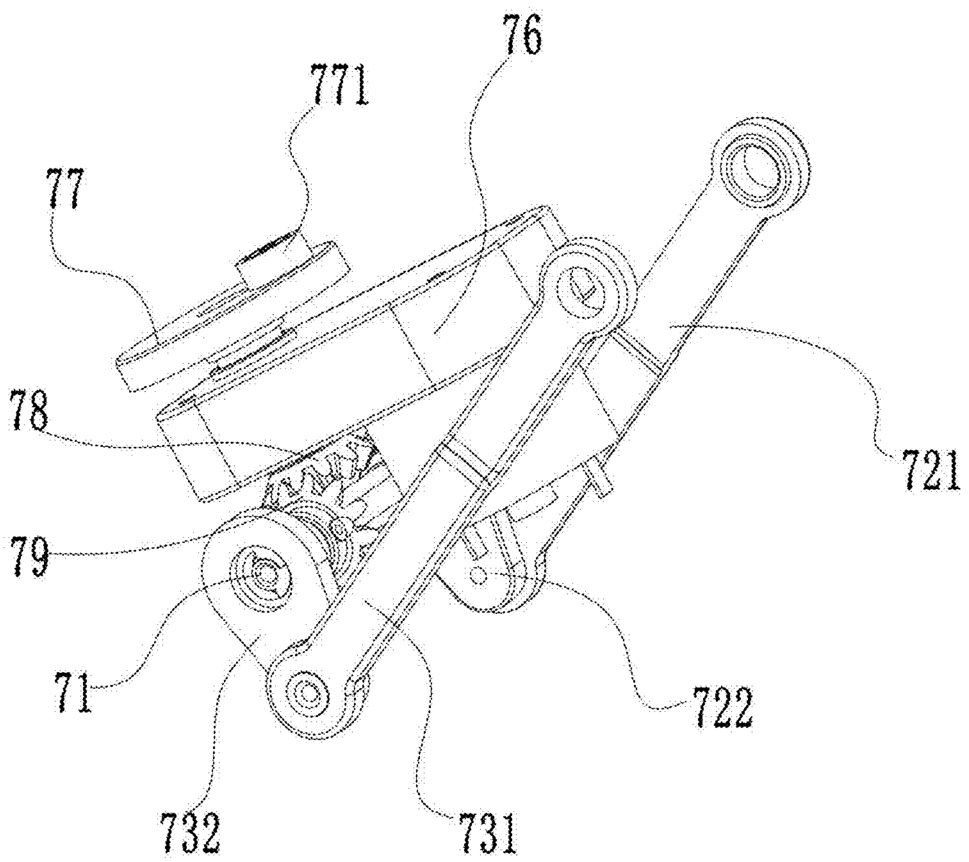
FIG. 5 is a schematic diagram of a structure of a power mechanism structure according to an embodiment of the present application.
Figure 6:
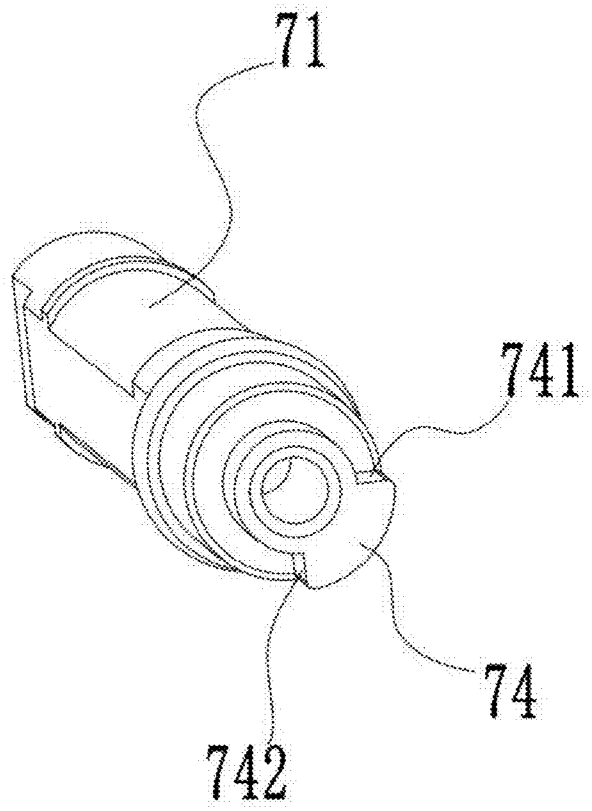
FIG. 6 is a schematic diagram of a structure of a connecting rod according to an embodiment of the present application.
Figure 7:
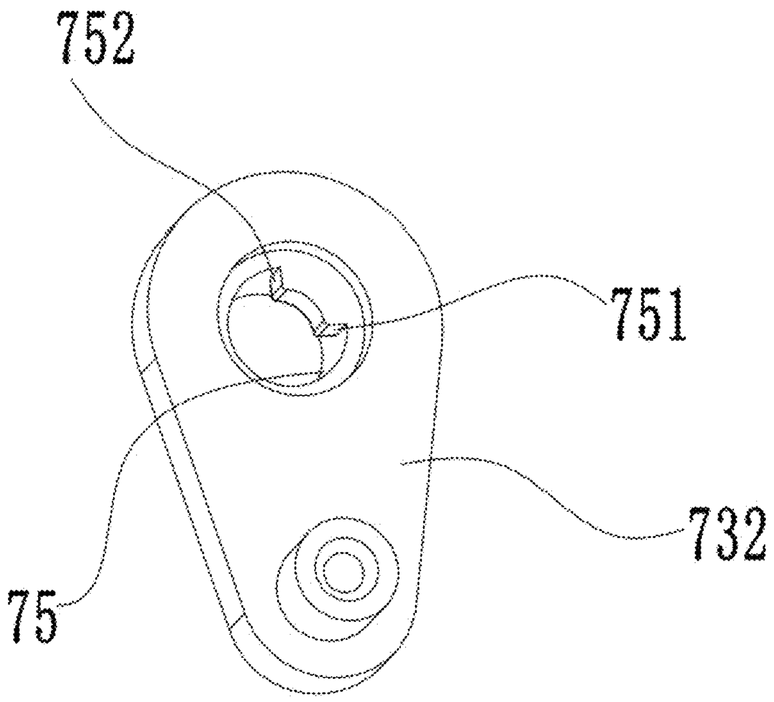
FIG. 7 is a schematic diagram of a structure of a second rotating block according to an embodiment of the present application.

Further, a power mechanism 7 is provided in the bracket 1, and the first massage portion 2 is eccentrically and rotatably connected to the power mechanism 7. As shown in FIGS. 5, 6, and 7, the power mechanism 7 includes a connecting rod 71. One end of the connecting rod 71 is connected to a first connecting rod assembly 72, and the other end of the connecting rod 71 is connected to a second connecting rod assembly 73. The first connecting rod assembly 72 is rotatably connected to the second massage portion 3, and the second connecting rod assembly 73 is rotatably connected to the third massage portion 4. The connection between the connecting rod 71 and the second connecting rod assembly 73 is provided with a matching angle adjustment structure to provide a space for relative rotational adjustment at the connection between the connecting rod 71 and the second connecting rod assembly 73. Generally, if 180 degrees of adjustment can be achieved, the second connecting rod assembly 73 and the first connecting rod assembly 72 can be adjusted to act synchronously or asynchronously. The matching angle adjustment structure can be a ratchet and pawl matching structure or a sliding slot structure. In this embodiment, the sliding slot structure is used. The synchronous and asynchronous actions are achieved by adjusting the rotation direction of the connecting rod 71. When the connecting rod 71 rotates counterclockwise, the second massage portion 3 and the third massage portion 4 slide back and forth synchronously. When the connecting rod 71 rotates clockwise, the second massage portion 3 and the third massage portion 4 slide back and forth asynchronously. The massage actions of the second massage portion 3 and the third massage portion 4 can be adjusted by adjusting the rotation direction of the connecting rod 71 driven by the power mechanism 7. In the specific massage process, at least two compound massage actions can be performed on the human body parts. One is when the power mechanism 7 drives the first massage portion 2 to perform reciprocating massage, the second massage portion 3 and the third massage portion 4 perform reciprocating massage synchronously, achieving an effect of massaging two positions back and forth on the human body parts. The other is when the power mechanism 7 drives the first massage portion 2 to perform reciprocating massage, the second massage portion 3 and the third massage portion 4 perform reciprocating massage asynchronously, achieving a reciprocating massage effect and a rubbing massage effect on the human body. Therefore, the massage effect on human body parts can be improved.

Specifically, in this embodiment, a sliding slot structure is configured to adjust the action angle of the second connecting rod assembly 73. As shown in FIGS. 6 and 7, the matching angle adjustment structure includes a first limiting portion 74 provided at the end portion of the connecting rod 71 and a first matching piece 75 provided on the second connecting rod assembly 73. The first limiting portion 74 has a first positioning surface 741 and a second positioning surface 742 arranged at a 90-degree angle to each other. The first matching piece 75 has a first matching surface 751 and a second matching surface 752 arranged at a 270-degree angle to each other. When the connecting rod 71 rotates counterclockwise, the first positioning surface 741 fits the first matching surface 751. When the connecting rod 71 rotates clockwise, the second positioning surface 742 fits the second matching surface 752. When the first limiting portion 74 on the connecting rod 71 rotates within the first matching piece 75 to change the angle, the second connecting rod assembly 73 can act synchronously or asynchronously relative to the first connecting rod assembly 72. The angles proposed in this embodiment are all based on the horizontal plane. The first limiting portion 74 is provided with a first positioning surface 741 and a second positioning surface 742 arranged at a 90-degree angle to each other, and in the first matching piece 75, a first matching surface 751 and a second matching surface 752 are arranged at a 270-degree angle to each other. When the connecting rod 71 rotates counterclockwise, the first positioning surface 741 fits the first matching surface 751 to drive the second connecting rod assembly 73 to act synchronously relative to the first connecting rod assembly 72. When the connecting rod 71 rotates clockwise, the first limiting portion 74 rotates 180 degrees in the first matching piece 75 to switch the angle, allowing the second positioning surface 742 to fit the second matching surface 752 to drive the second connecting rod assembly 73 to act asynchronously relative to the first connecting rod assembly 72.

As shown in FIG. 5, the first connecting rod assembly 72 includes a first pull rod 721 rotatably connected to the second massage portion 3 and a first rotating block 722 rotatably connected to the end portion of the first pull rod 721. The first rotating block 722 is fixedly connected to the connecting rod 71. When the connecting rod 71 rotates with the first rotating block 722, the first pull rod 721 is driven to swing back and forth.

The second connecting rod assembly 73 includes a second pull rod 731 rotatably connected to the third massage portion 4 and a second rotating block 732 rotatably connected to the end portion of the second pull rod 731. The first matching piece 75 is arranged on the second rotating block 732. Similarly, when the connecting rod 71 rotates with the second rotating block 732, the second pull rod 731 is driven to swing back and forth. Under the action of the matching angle adjustment structure, when the connecting rod 71 switches the rotation direction, the reciprocating swing frequency of the second pull rod 731 can be synchronously or asynchronously adjusted relative to the action frequency of the first pull rod 721.

Moreover, as shown in FIG. 5, the power mechanism 7 includes a drive motor 76 installed in the bracket 1. The drive motor 76 can be a brushed motor or a brushless motor, provided that switching between forward and reverse rotation according to the operating state is possible. An eccentric wheel 77 is installed at one end of the output shaft of the drive motor 76, and a connecting column 771 connected to the first massage portion 2 is provided on the eccentric wheel 77. After the eccentric wheel 77 rotates, the first massage portion 2 is driven to slide back and forth relative to the bracket 1. Moreover, a first bevel gear 78 is installed at the other end of the output shaft of the drive motor 76, and a second bevel gear 79 meshing with the first bevel gear 78 is installed on the connecting rod 71, thereby driving the connecting rod 71 to rotate. Specifically, after the drive motor 76 adjusts the rotation direction, the rotation direction of the connecting rod 71 is switched. Generally, the axis of the drive motor 76 is perpendicular to the axis of the connecting rod 71.

Figure 3:
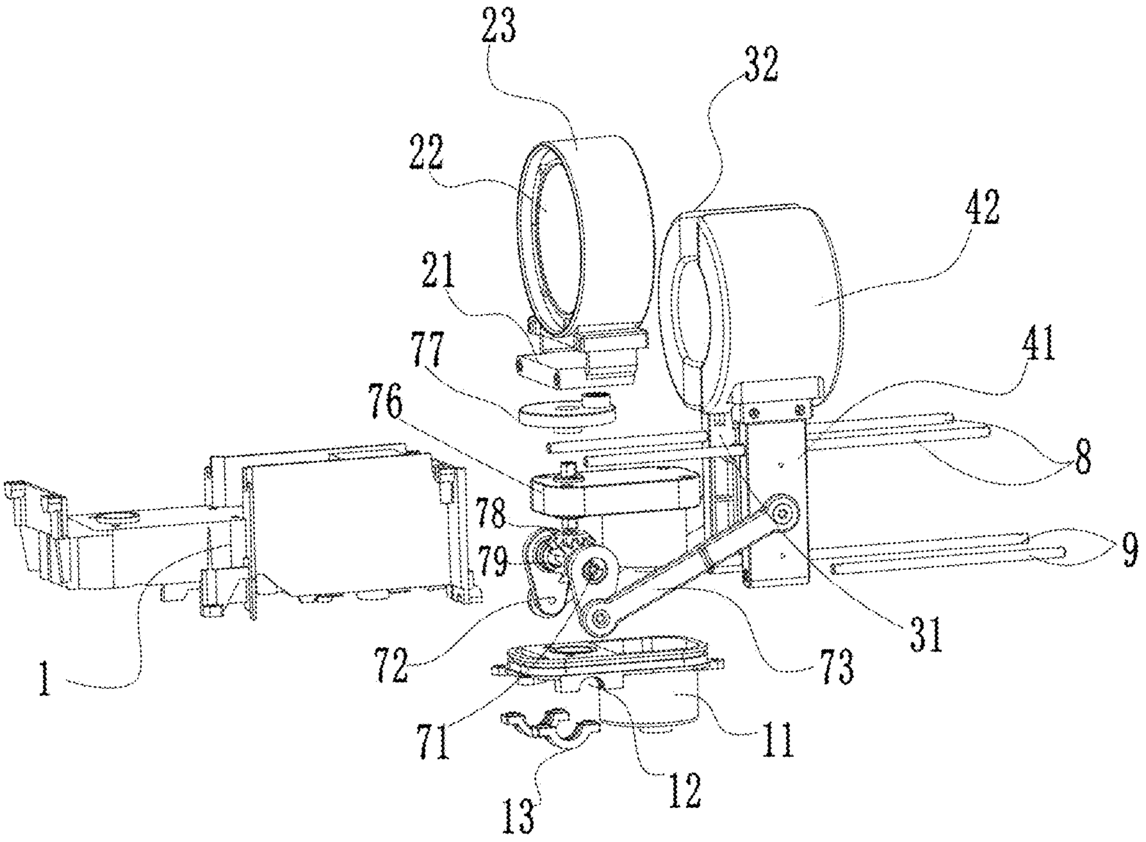
FIG. 3 is a schematic diagram of an exploded structure according to an embodiment of the present application.
Figure 9:
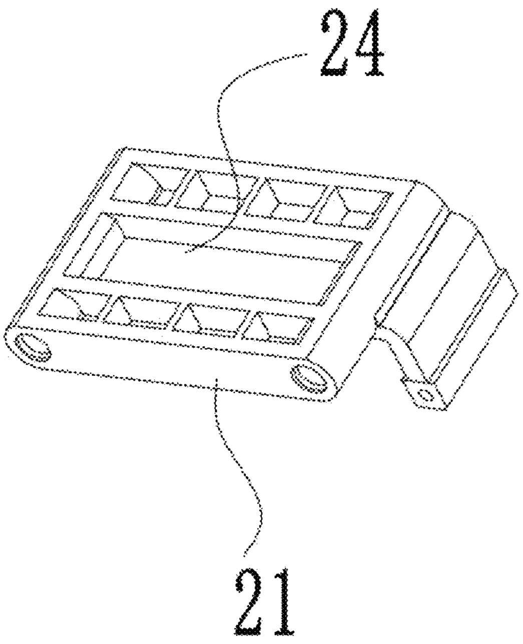
FIG. 9 is a schematic diagram of a structure of a front bracket seat according to an embodiment of the present application.

Specifically, as shown in FIGS. 3 and 9, the first massage portion 2 includes a front bracket seat 21 slidably mounted on the bracket 1, and the front bracket seat 21 is provided with an inner ring layer 22 and an outer ring layer 23 coaxially arranged, and a connecting portion evenly distributed along a circumferential direction is provided between the inner ring layer 22 and the outer ring layer 23. The front bracket seat 21 is provided with a sliding slot 24 that slidably fits with the connecting column 771. When the eccentric wheel 77 moves relative to the sliding slot 24 with the connecting column 771, the front bracket seat 21 slides relatively. The inner ring layer 22 and the outer ring layer 23 are configured to embed a flexible massage ring. Then, the part that contacts the human body is the flexible massage ring, thereby avoiding injury to the human body and providing a more comfortable massage action.

Specifically, as shown in FIG. 3, the second massage portion 3 includes a first slider 31 slidably mounted on the bracket 1 and a first rubbing bracket 321 mounted on the first slider 31. The second massage portion 3 further includes a second slider 41 slidably mounted on the bracket 1 and a second rubbing bracket 421 mounted on the second slider 41. Massage actions are realized by driving the first slider 31 and the second slider 41 to act respectively. Both the first rubbing bracket 321 and the second rubbing bracket 421 are equipped with a flexible massage portion of a semi-ring structure, and two flexible massage portions enclose to form a second massage chamber 6. The flexible massage portion contacts the human body to avoid injury and provide a more comfortable massage action.

In order to stably guide and limit the sliding of the front bracket seat, the first slider 31 and the second slider 41 on the bracket 1, two upper guide rods 8 are installed on the bracket 1 at a distance from each other. The front bracket seat is slidably installed on the two upper guide rods 8 to ensure that the front bracket seat remains stable during the sliding process. Moreover, two lower guide rods 9 are installed on the bracket 1 at a distance from each other. The first slider 31 is installed on the upper guide rod 8 and the lower guide rod 9, with both guide rods located on one side of the bracket 1. The second slider 41 is installed on the upper guide rod 8 and the lower guide rod 9, with both guide rods located on the other side of the bracket 1. This allows the first slider 31 and the second slider 41 to slide independently without interfering with each other, thereby ensuring sliding stability.

Figure 8:
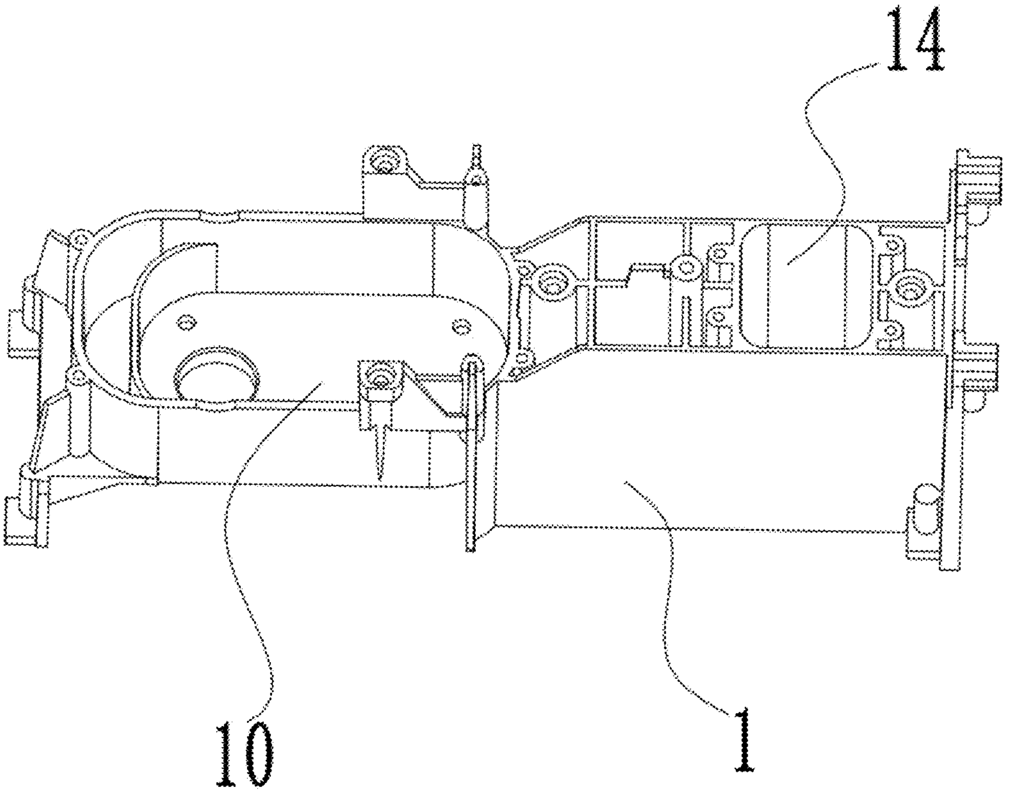
FIG. 8 is a schematic diagram of a structure of a bracket according to an embodiment of the present application.

Specifically, as shown in FIG. 8, a first mounting cavity 10 is provided on the bracket 1 for mounting the drive motor 76, and a cover body 11 is provided on the bracket 1 for closing the first mounting cavity 10. The drive motor 76 is mounted in the first mounting cavity 10 and is sealed by the cover body 11 to effectively protect the drive motor 76.

Moreover, the cover body 11 is provided with a rotating half-groove 12 for installing the connecting rod 71, and a limit cover 13 is installed on the rotating half-groove 12 for limiting the connecting rod 71. This facilitates the rotational installation of the connecting rod 71 and ensures a compact transmission connection. Specifically, when the connecting rod 71 is rotatably installed, bearings can be added to reduce friction.

Figure 4:
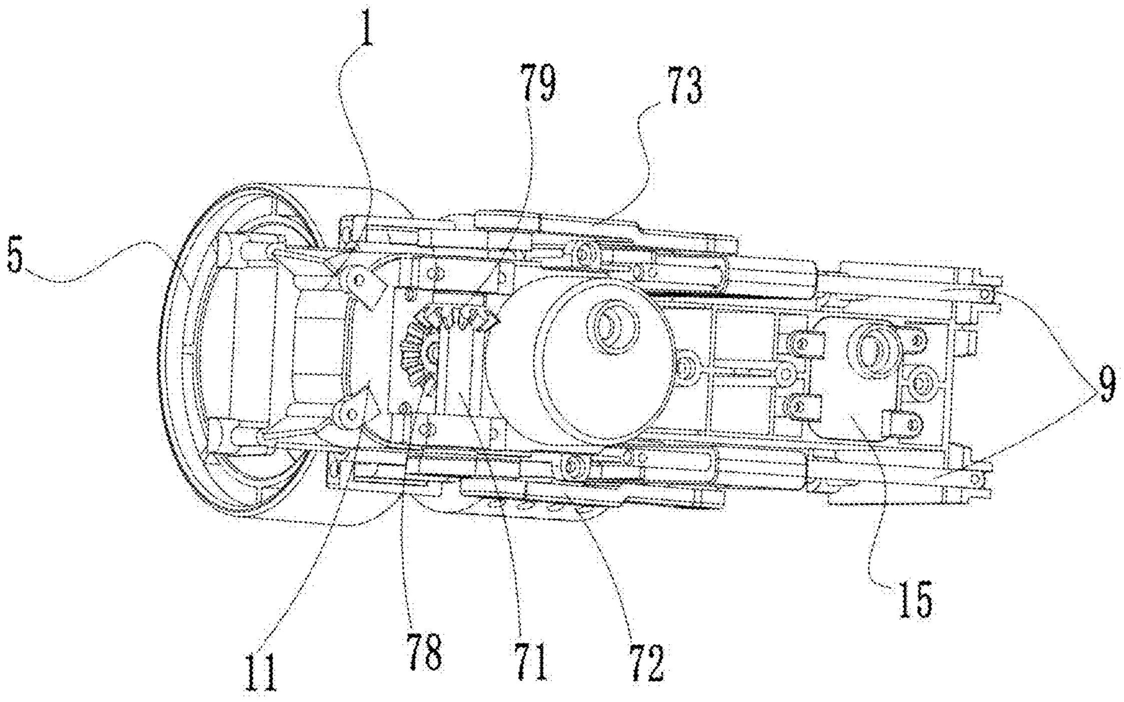
FIG. 4 is a schematic diagram of a bottom-view structure according to an embodiment of the present application.

Specifically, as shown in FIG. 4, the bracket 1 is provided with a second mounting cavity 14 for mounting a battery, and the bracket 1 is further provided with a sealing cover 15 for sealing the second mounting cavity 14. The battery is housed in the second mounting cavity 14 and protected by the sealing cover 15, facilitating the miniaturization of the structure of the entire drive mechanism.

Moreover, the bracket 1 is provided with a space for mounting an integrated circuit board. This design prevents excessive space occupation after the circuit board is integrated and makes full use of stepped grooves and other structures on the bracket 1. Moreover, the bracket 1 is provided with a weight-reducing cavity, and ribs and mounting columns are provided in the weight-reducing cavity to ensure the structural strength of the bracket 1 and reduce the overall weight. A connection position is reserved for installing the entire drive mechanism into the massager, with the connection being achievable, for example, by using the mounting columns.

In the present application, unless otherwise specified or restricted, the terms “mount”, “be connected to”, “be connected with”, and “fix” shall be understood as a general sense. For example, the connection can be fixed connection, removable connection, integrated connection, mechanical connection, electrical connection, direct connection, indirect connection through intermediate media, connection between two components or interaction between two components. For those of ordinary skill in the art, the specific meaning of the preceding terms in the present application can be understood according to specific situations.

In the description of the present application, it needs to be noted that the azimuth or position relationships indicated by the terms “center”, “upper”, “lower”, “left”, “right”, “inside”, and “outside” are based on those shown in the drawings, or those in which a product of the present application is usually placed when used. It is only for convenience of description and simplification of the present application, not to indicate or imply that the referred devices or components must have a specific orientation, be constructed and operated in a specific orientation, and thus cannot be understood as limiting the present application. Furthermore, the terms “first”, “second”, and the like are used merely for descriptive purposes and should not be interpreted as indicating or implying relative importance.

It is obvious to those skilled in the art that the present application is not limited to the details of the above exemplary embodiments, and can be implemented in other specific forms without departing from the spirit or basic features of the present application. Therefore, no matter from which point of view, the embodiments should be regarded as exemplary and not restrictive, and the scope of the present application is defined by the appended claims rather than by the above description. It is therefore intended to include in the present application all the changes which come within the meaning and range of equivalent of the claims. Any reference numerals in the claims shall not be construed as limiting the claims involved.

What is claimed is:

1. A driving mechanism with compound massage actions, comprising a bracket, wherein a first massage portion, a second massage portion, and a third massage portion are slidably mounted on the bracket; the first massage portion is provided with a first massage chamber, the second massage portion and the third massage portion enclose to form a second massage chamber, and the first massage chamber and the second massage chamber are coaxially arranged; and the bracket is provided with a power mechanism inside, wherein the first massage portion is eccentrically and rotatably connected to the power mechanism, the power mechanism comprises a connecting rod, one end of the connecting rod is connected to a first connecting rod assembly, and the other end of the connecting rod is connected to a second connecting rod assembly; wherein the first connecting rod assembly is rotatably connected to the second massage portion, the second connecting rod assembly is rotatably connected to the third massage portion, and the connection between the connecting rod and the second connecting rod assembly is provided with a matching angle adjustment structure; wherein when the connecting rod rotates counterclockwise, the second massage portion and the third massage portion slide back and forth synchronously, and when the connecting rod rotates clockwise, the second massage portion and the third massage portion slide back and forth asynchronously;

wherein: the matching angle adjustment structure comprises a first limiting portion provided at the end portion of the connecting rod and a first matching piece provided on the second connecting rod assembly, the first limiting portion has a first positioning surface and a second positioning surface arranged at a 90-degree angle to each other, and the first matching piece has a first matching surface and a second matching surface arranged at a 270-degree angle to each other: wherein when the connecting rod rotates counterclockwise, the first positioning surface fits the first matching surface;

and when the connecting rod rotates clockwise, the second positioning surface fits the second matching surface;

wherein: the first connecting rod assembly comprises a first pull rod rotatably connected to the second massage portion and a first rotating block rotatably connected to the end portion of the first pull rod, and the first rotating block is fixedly connected to the connecting rod.

2. The driving mechanism with the compound massage actions according to claim 1, wherein: the second connecting rod assembly comprises a second pull rod rotatably connected to the third massage portion and a second rotating block rotatably connected to the end portion of the second pull rod, and the first matching piece is provided on the second rotating block.

3. The driving mechanism with the compound massage actions according to claim 1, wherein: the power mechanism comprises a drive motor installed in the bracket, an eccentric wheel is installed at one end of an output shaft of the drive motor, and a connecting column connected to the first massage portion is provided on the eccentric wheel; and a first bevel gear is installed at the other end of the output shaft of the drive motor, and a second bevel gear meshing with the first bevel gear is installed on the connecting rod.

4. The driving mechanism with the compound massage actions according to claim 3, wherein: the first massage portion comprises a front bracket seat slidably mounted on the bracket, the front bracket seat is provided with an inner ring layer and an outer ring layer coaxially arranged, and a connecting portion evenly distributed along a circumferential direction is provided between the inner ring layer and the outer ring layer; and the front bracket seat is provided with a sliding slot that slidably fits with the connecting column.

5. The driving mechanism with the compound massage actions according to claim 4, wherein: the second massage portion comprises a first slider slidably mounted on the bracket and a first rubbing bracket mounted on the first slider, and the second massage portion further comprises a second slider slidably mounted on the bracket and a second rubbing bracket mounted on the second slider.

6. The driving mechanism with the compound massage actions according to claim 5, wherein: two upper guide rods are installed on the bracket at a distance from each other, and the front bracket seat is slidably installed on the two upper guide rods; and two lower guide rods are installed on the bracket at a distance from each other, the first slider is installed on the upper guide rod and the lower guide rod located on one side of the bracket, and the second slider is installed on the upper guide rod and the lower guide rod located on the other side of the bracket.

7. The driving mechanism with the compound massage actions according to claim 6, wherein: the inner ring layer and the outer ring layer are configured to embed a flexible massage ring.

8. The driving mechanism with the compound massage actions according to claim 7, wherein: both the first rubbing bracket and the second rubbing bracket are provided with a flexible massage portion of a semi-ring structure, and two flexible massage portions enclose to form a second massage chamber.

9. The driving mechanism with the compound massage actions according to claim 3, wherein: the bracket is provided with a first mounting cavity for installing the drive motor, and the bracket is further provided with a cover body for closing the first mounting cavity.

10. The driving mechanism with the compound massage actions according to claim 9, wherein: the cover body is provided with a rotating half-groove for installing a connecting rod, and a limit cover is installed on the rotating half-groove for limiting the connecting rod.

11. The driving mechanism with the compound massage actions according to claim 9, wherein: the bracket is provided with a second mounting cavity for mounting a battery, and the bracket is further provided with a sealing cover for sealing the second mounting cavity.

12. The driving mechanism with the compound massage actions according to claim 11, wherein: the bracket is provided with a space for mounting an integrated circuit board.

13. The driving mechanism with the compound massage actions according to claim 3, wherein: the drive motor is a brushed motor or a brushless motor.

14. The driving mechanism with the compound massage actions according to claim 3, wherein: the bracket is provided with a weight-reducing cavity, and ribs and mounting columns are provided in the weight-reducing cavity.

* * * * *